United States Patent
Peterson et al.

(10) Patent No.: US 7,843,944 B2
(45) Date of Patent: Nov. 30, 2010

(54) SYSTEM AND METHOD TO PROVIDE MULTIPLE PRIVATE NETWORKS USING MPLS

(75) Inventors: C. Robert Peterson, Idaho Falls, ID (US); Thomas F. Herbert, Richmond, VA (US)

(73) Assignee: Entry Point, LLC, Idaho Falls, ID (US)

( * ) Notice: Subject to any disclaimer, the term of this patent is extended or adjusted under 35 U.S.C. 154(b) by 0 days.

(21) Appl. No.: 12/181,257

(22) Filed: Jul. 28, 2008

(65) Prior Publication Data

US 2008/0310424 A1 Dec. 18, 2008

Related U.S. Application Data

(63) Continuation-in-part of application No. 11/616,805, filed on Dec. 27, 2006.

(60) Provisional application No. 60/952,837, filed on Jul. 30, 2007.

(51) Int. Cl.
*H04L 12/56* (2006.01)

(52) U.S. Cl. .................................. 370/395.5

(58) Field of Classification Search ........................ None
See application file for complete search history.

(56) References Cited

U.S. PATENT DOCUMENTS

| | | |
|---|---|---|
| 6,381,216 B1 | 4/2002 | Prasad |
| 6,526,046 B1 | 2/2003 | Carew |
| 6,760,775 B1 | 7/2004 | Anerousis et al. |
| 6,775,284 B1 | 8/2004 | Calvignac et al. |
| 6,785,279 B1 | 8/2004 | Crooks |
| 6,798,751 B1 | 9/2004 | Voit et al. |
| 6,891,825 B1 | 5/2005 | O'Dell et al. |
| 6,898,276 B1 | 5/2005 | Millet et al. |
| 6,904,054 B1 | 6/2005 | Baum et al. |
| 7,002,995 B2 | 2/2006 | Chow et al. |
| 7,009,982 B2 | 3/2006 | Scott et al. |
| 7,068,654 B1 | 6/2006 | Joseph et al. |
| 7,113,512 B1 | 9/2006 | Holmgren et al. |
| 7,120,150 B2 | 10/2006 | Chase et al. |

(Continued)

FOREIGN PATENT DOCUMENTS

EP 1 404 081 3/2004

OTHER PUBLICATIONS

Peterson, U.S. Appl. No. 11/616,805, filed Dec. 27, 2006.

(Continued)

*Primary Examiner*—Ricky Ngo
*Assistant Examiner*—Clemence Han
(74) *Attorney, Agent, or Firm*—Workman Nydegger

(57) ABSTRACT

A system and method are supplied to provide multiple private networks. The system can include an Multi-Protocol Label Switching (MPLS) interface configured to receive a plurality of data stream types from a packet switched network. A plurality of local area network ports can be configured to communicate data to local area networks. A switching process can be provided between the MPLS interface and the local area network ports. The switching process can be configured to map individual data stream types from the MPLS interface to each of the respective local area network ports. In addition, the switching process can communicate packets between the MPLS interface and the mapped local area network ports.

24 Claims, 7 Drawing Sheets

U.S. PATENT DOCUMENTS

| | | |
|---|---|---|
| 7,136,386 B2 | 11/2006 | Allen et al. |
| 7,184,440 B1 | 2/2007 | Sterne et al. |
| 7,292,581 B2 | 11/2007 | Finn |
| 2001/0052012 A1 | 12/2001 | Rinne et al. |
| 2003/0189898 A1* | 10/2003 | Frick et al. ............... 370/227 |
| 2004/0037260 A1 | 2/2004 | Kakemizu et al. |
| 2004/0037296 A1* | 2/2004 | Kim et al. ............. 370/395.53 |
| 2004/0114570 A1 | 6/2004 | Vikberg et al. |
| 2004/0165592 A1 | 8/2004 | Chen et al. |
| 2004/0165600 A1* | 8/2004 | Lee ..................... 370/395.53 |
| 2004/0218614 A1 | 11/2004 | Yokomitsu et al. |
| 2005/0018605 A1* | 1/2005 | Foote et al. ............... 370/230 |
| 2005/0120089 A1* | 6/2005 | Kang et al. ............... 709/213 |
| 2005/0169279 A1 | 8/2005 | Magd et al. |
| 2006/0013142 A1* | 1/2006 | Hongal et al. ............. 370/248 |
| 2006/0072589 A1* | 4/2006 | Mandavilli et al. ......... 370/400 |
| 2006/0098632 A1 | 5/2006 | Johnson |
| 2006/0239273 A1* | 10/2006 | Buckman et al. ....... 370/395.41 |
| 2006/0248229 A1 | 11/2006 | Saunderson et al. |
| 2006/0251074 A1* | 11/2006 | Solomon ................... 370/392 |
| 2006/0291473 A1 | 12/2006 | Chase et al. |
| 2007/0058558 A1 | 3/2007 | Cheung et al. |
| 2008/0144632 A1* | 6/2008 | Rabie et al. ............. 370/395.5 |
| 2009/0028162 A1* | 1/2009 | Hu ........................ 370/395.53 |

OTHER PUBLICATIONS

Tzung-Pao Lin et al., "Interconnection of large-scale LANs via a two-stage switching hub for multimedia applications," Proceedings 19th Conference on Local Computer Networks, Oct. 2-5, 1994; IEEE Computer Society, 1994, ISBN 0-8186-6680-3, pp. 249-256.

Office Action dated Apr. 2, 2009 from U.S. Appl. No. 11/616,805, filed Dec. 27, 2006 (17 pages).

Office Action dated Dec. 11, 2009 from U.S. Appl. No. 11/616,805, filed Dec. 27, 2006 (14 pages).

Office Action dated Mar. 31, 2010 from U.S. Appl. No. 11/616,805, filed Dec. 27, 2006 (17 pages).

* cited by examiner

Legend for Figure 4

| | |
|---|---|
| Add/Drop Mux | Public Switch Telephone Network |
| Label Switch Router | |
| Router | Cable Head End |
| Provider Edge | Fiber Pair or Copper Pair |
| DWDM | |
| DWDM | Bridge |
| Single Mode Fiber | Wireless Access Point |
| Fiber | Utility Management Module |
| PBX/T1 and above | Data Network |
| POTS < T1 | TV NTSC/MPEG |
| Mobile User (PDA, etc) | |
| Express power Module | |

SYSTEM AND METHOD TO PROVIDE MULTIPLE PRIVATE NETWORKS USING MPLS

CROSS-REFERENCE TO RELATED APPLICATIONS AND CLAIM OF PRIORITY

This is a continuation-in-part of U.S. patent application Ser. No. 11/616,805 filed on Dec. 27, 2006. Priority of U.S. Provisional patent application Ser. No. 60/952,837 filed on Jul. 30, 2007 is claimed.

FIELD OF THE INVENTION

The present invention relates generally to communication networking.

BACKGROUND

Today, telephone and cable networks are the core information infrastructure of virtually every business (large or small) and home user. E-business is no longer a concept or catch-phrase, it is a way of life. As a result, business requirements are fueling evolution and innovation in the network. This has created a demand for new services such as data, voice, video, and other packet protocol applications. To meet these demands, legacy voice, cable TV and data networks are headed for convergence onto a common, ubiquitous, multi-purpose network-based platform.

If or when the telecommunication industry arrives at a set of communication interface standards, this will set the stage for the next generation of data communication, which is service creation. To deliver converged services such as voice, video and data with Quality of Service (QoS) cost effectively, carriers desire to stretch network intelligence from the Central Office (CO) to the customer premises.

Traditional Internet Protocol (IP) networks, operate on a connectionless, best-effort basis, with all packets subject to equal treatment as they are routed individually hop-by-hop throughout the network to their ultimate destination. This best-effort model of fairness translates to relative unfairness for traffic that is more sensitive to network impairments and does not align well with business plans that call for delivery of a rich portfolio of differentiated services and applications.

Consequently, delivering revenue-generating applications over converged, IP-based infrastructures creates a desire for a different breed of access networks. This type of network can be engineered to deliver carrier-class service but the network can be optimized to associate traffic streams with the respective applications and process each traffic stream according to a predefined Service Level Agreement (SLA). Customers desire such optimized networks to provide the same and preferably better service quality than existing infrastructures. To ensure that each service receives the appropriate QoS treatment and meets SLA obligations, the Network Interface Device (NID) will manage, monitor and control network traffic at the service level (i.e., provide advanced traffic management and engineering services).

SUMMARY

A system and method are supplied to provide multiple private networks. The system can include a Multi-Protocol Label Switching (MPLS) interface configured to receive a plurality of data stream types from a packet switched network. A plurality of local area network (LAN) ports can be configured to communicate data to a plurality of LAN. A switching process can be provided between the MPLS interface and the LAN ports. The switching process can be configured to map individual data stream types from the MPLS interface to each of the respective LAN ports. In addition, the switching process can communicate packets between the MPLS interface and the mapped LAN ports.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 4*a* is a legend illustrating the meaning of symbols in FIG. 4;

DETAILED DESCRIPTION

Figure 1:
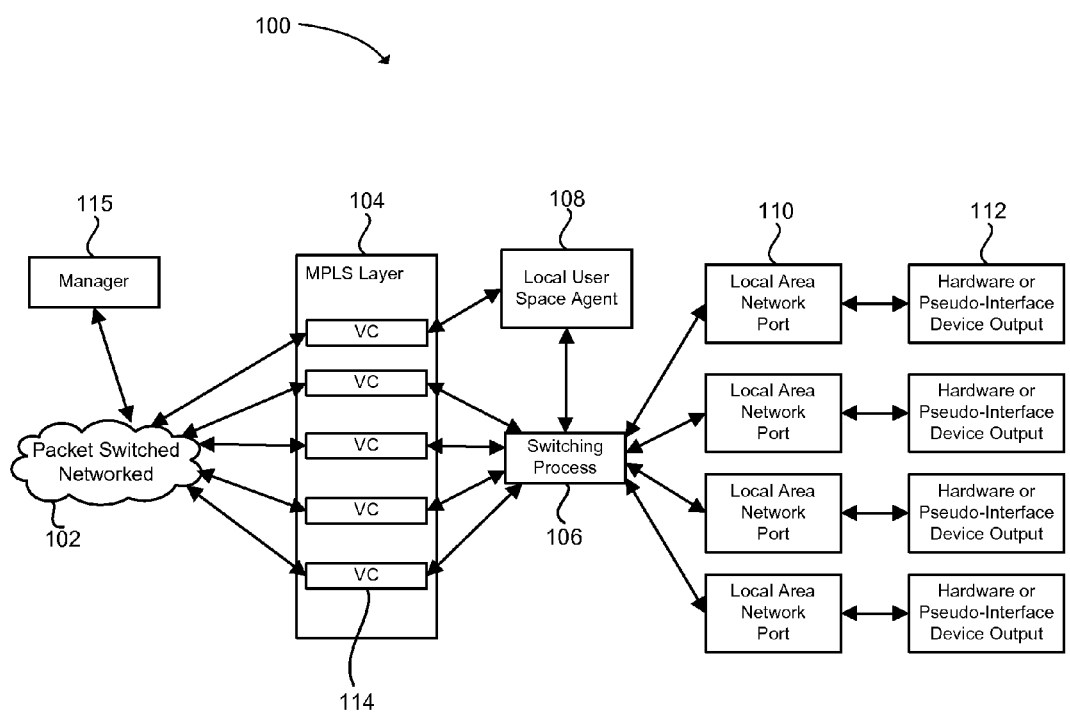
FIG. 1 illustrates a block diagram of a system to provide multiple private networks in accordance with an embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

A system and method are disclosed to provide multiple private networks 100, as illustrated in FIG. 1. The system can include an MPLS layer and interface 104 configured to receive a plurality of data stream types from a packet switched network 102. The packet switched network may be used in transporting information from other networks or an information backbone, and the packet switched network can include an MPLS network. The MPLS interface and network can also include a plurality of Virtual Circuits (VC) 114 through which information packets are received via the packet switched network.

A plurality of LAN ports 110 can be configured to communicate data to a single or a plurality of LANs. The LAN ports can include hardware output devices 112 or pseudo-interface device outputs or wireless LAN outputs that can transmit signals out to one or a plurality of LANs. Each of the LAN ports can be separate Ethernet port. The hardware output devices can each be connected to or be a part of a separate LAN. A plurality of local devices can then each be connected to a plurality of separate LANs.

The term "local network port" can be defined as either a physical port, a logical software channel or channel endpoint in a communications system. In addition, the term port as used herein may also include the hardware output to provide the physical link layer for the logical software channel.

A switching process 106 can be provided between the MPLS layer and interface 104 and the LAN ports 110. The switching process can be configured to map individual data stream types from the MPLS interface to each of the respective LAN ports and to communicate packets between the MPLS interface and the mapped LAN ports. An individual data stream type that can be bound to a single Ethernet port may be a VC or a similar connection oriented protocol that can be used within the MPLS protocol.

The individual data stream type may be bound to a single Ethernet port by QoS specified by contract with a customer. Each Ethernet port can connect to a plurality of LANs that will be Ethernet networks in one embodiment. While Ethernet is described herein, other types of LAN communication protocols could also be mapped to individual VCs.

The switching process 106 may register each LAN port by port or interface number and communicate through an operating system to each LAN port. The switching process can map individual VC's to Ethernet ports using Request for Comments (RFC) 4448 Encapsulation Methods for Transport of Ethernet over MPLS (EoMPLS). The switching process can then switch packets from a VC to its mapped Ethernet port.

By using the switching system to extend the switching protocol to the customer premises, transport carriers can apply virtual switching to the local loop and enable a connectionless IP infrastructure to support connection-oriented services. Providers can manage network traffic at the service level by classifying, mapping and aggregating ingress traffic into service and/or application level virtual connections. The customers or end users that have one or more LANs connected to the private network device or network interface device will be able to receive Ethernet encapsulation over an MPLS network.

The system for providing multiple private networks can include a local user space agent 108 that is a process configured to remotely manage or control settings and switching paths for the switching process 106. The user space control process can be in direct communication with the switching process to control the switching. There can be a remote manager 115 or management interface that is in communication with the local user space agent 108 for controlling the switching process 106. The remote manager may be a client application that is on an administrator's desktop or a web browser that can access the NID through the local user space agent 108. A simple network management protocol (SNMP) interface can also be part of the remote manager interface to manage the hardware and configuration items and aspects of the overall system and device.

The multiple private network device or NID can use RFC 4448. RFC 4448 is used in an embodiment to transport Ethernet traffic over an MPLS connection. When receiving information from the physical layer (Digital Subscriber Line (xDSL), Fiber, wireless, etc) connections, the NID will convert MPLS packets to bridged Packet Data Units (PDU). By using these RFC 4448 interfaces on the NID switch or a similarly-capable device, an embodiment of the invention can offer increased performance and flexibility. In addition, RFC 4448 in bridged mode reduces the security risk by separating the protocol (MPLS) used to transport the data from the protocol (Encapsulated Ethernet, TCP/IP) used to provide the service. Applying the present system and method for transferring data is straight forward because the system can bind a VC to each Ethernet port.

In one embodiment, the switching system adds an additional MPLS label onto MPLS packets to enable the switching of the incoming packets from the VCs to the Ethernet ports. These labels can be called a VC label and this allows a VC label (in MPLS) to be bound to an Ethernet tag.

Using this system and method, the multiple private network device or NID can bind together different interfaces, including MPLS VCs to Ethernet interfaces. This embodiment of the invention does not typically need to incorporate details about higher level protocols, such as TPC/IP. In addition, the present system and method does not generally need to incorporate any details Address Resolution Protocol (ARP).

An embodiment of voice traffic may use Voice over Internet Protocol (VoIP) and Analog Telephone Adapter (ATA). A common ATA is a device with at least one telephone jack (Foreign Exchange Subscriber (FXS) port) used to connect a conventional telephone and an Ethernet jack as an adapter to the LAN. Using such an ATA, it is possible to connect a conventional telephone to a remote VoIP switch. The ATA communicates with the remote VoIP switch using a VoIP protocol such as H.323, Session Initiation Protocol (SIP), Media Gateway Control Protocol (MGCP) or Inter-Asterisk eXchange protocol (IAX) and encodes and decodes the voice signal using a voice codec such as ulaw, alaw, Internet Low Bitrate Codec (ILBC) and others. Since ATAs communicate directly with a VoIP server, they do not require any software to be run on a personal computer, such as a Softphone. Another embodiment may provide VoIP with Real-time Transport Protocol (RTP) encapsulated using RFC 4448.

With this system and method, video may also be provided using Internet Protocol TeleVision (IPTV) and a set top box. Information can also be output to a wireless network from the Ethernet output ports. The video or voice streams described can each be provided on their own separate LAN connection using a separate VC.

The input lines carrying the MPLS protocol from the data services provider can use fiber optic lines, such as GPON. The MPLS data packet traffic may be carried over a T3, T1, or a similar data connection.

The multiple private network device or NID is cost effective for operational expenditures, while increasing the number of services offered over a converged network. This system and method enables service providers to sell and/or market IP services (e.g., voice, video and data) rather than the underlying MPLS transport service that the IP service may be carried on. The customer may receive MPLS based services but the services can be packaged as part of an overall IP service offering.

An added value for the transport provider is shifting from basic switching to managing the network as an intelligent information utility. This includes automating and simplifying service delivery software and providing an enhancing NID to bring the service provider closer to the customer.

This system and method can provide additional services. For example, customers are becoming more aware of their networking needs and how to meet those needs at the most cost effective levels. Customers want on-demand services and self provisioning, and they desire these features immediately. Customer friendly consolidated billing becomes even more important as the customer moves to a single bill for multiple services spanning a mix of fixed and usage-based tariffs.

Other specific protocols can be encompassed in this system and method. For example, there are advantages offered by the co-existence of Asynchronous Transfer Mode (ATM) or Frame Relay and MPLS in enhancing existing networks and increasingly attention will be focused on these technology areas. One embodiment of the invention may use ATM or Frame Relay in the place of MPLS to transport the VCs. Development in the underlying transmission layer will simply provide more cost effective and faster transport of raw information, and the value of this system and method is in the differentiating and optimizing services offered to the end customer.

Also, the present system and method is valuable because it provides a set of interfaces that can accommodate practically all types of physical media such as fiber, copper DSL, wireless, coaxial cable, and power lines. In addition, the switching used is independent of the service provider's higher layer protocols.

Another benefit of the present system and method is the separation of the transport method from overlying services. While IP is very good for "best effort" connectionless data service, IP alone has significant deficiencies both in offering QoS and in partitioning traffic from different customers/service providers. Such features are normally offered by a connection-oriented model.

Security has recently become a more serious issue. One solution the present embodiments provide to this problem is to move the control plan out of band. In other words, the VCs help to separate and protect each network from easy IP intrusion. Because network granularity is increased, hackers will find it to be more difficult to access the resources they desire.

The other aspect of security is keeping critical services operating when using shared infrastructure. The service provider quite simply cannot have the Public Switched Telephone Network (PSTN) go down due to a problem with Internet traffic.

Security is a primary consideration in any public switched network. The transport provider desires to ensure that different service providers on a common infrastructure cannot affect each other and that denial-of-service (DoS) attacks or other malicious actions cannot interfere with SLA compliance. The present system and method in one embodiment of this invention provides this desired level of security.

In addition with this system and method, the transport provider can offer network security as a value-added service, protecting service providers from security attacks. Using the NID described herein, the transport provider can provide protection from attacks such as ARP spoofing, Dynamic Host Control Protocol (DHCP) attacks, and other threats.

The use of Ethernet alone in the last mile is beginning to be used widely now. It brings tremendous flexibility, but the security with Ethernet in the last mile, the transport provider's network is subject to the lower level of security associated with Ethernet. This is because point-to-point WAN (connection-oriented) services are easier to secure than the multi-point-to-multipoint networks generally based on switched Ethernet technologies. With Ethernet publicly available, hacker software and methods can be utilized by intruders to exploit standard Ethernet switch mechanisms without any expert knowledge, so the transport provider should choose a solution that includes support for many robust security features including the separation of address space. Therefore, since the NID of the present system and method is a point-to-point system, a higher level of security is provided.

Figure 2:
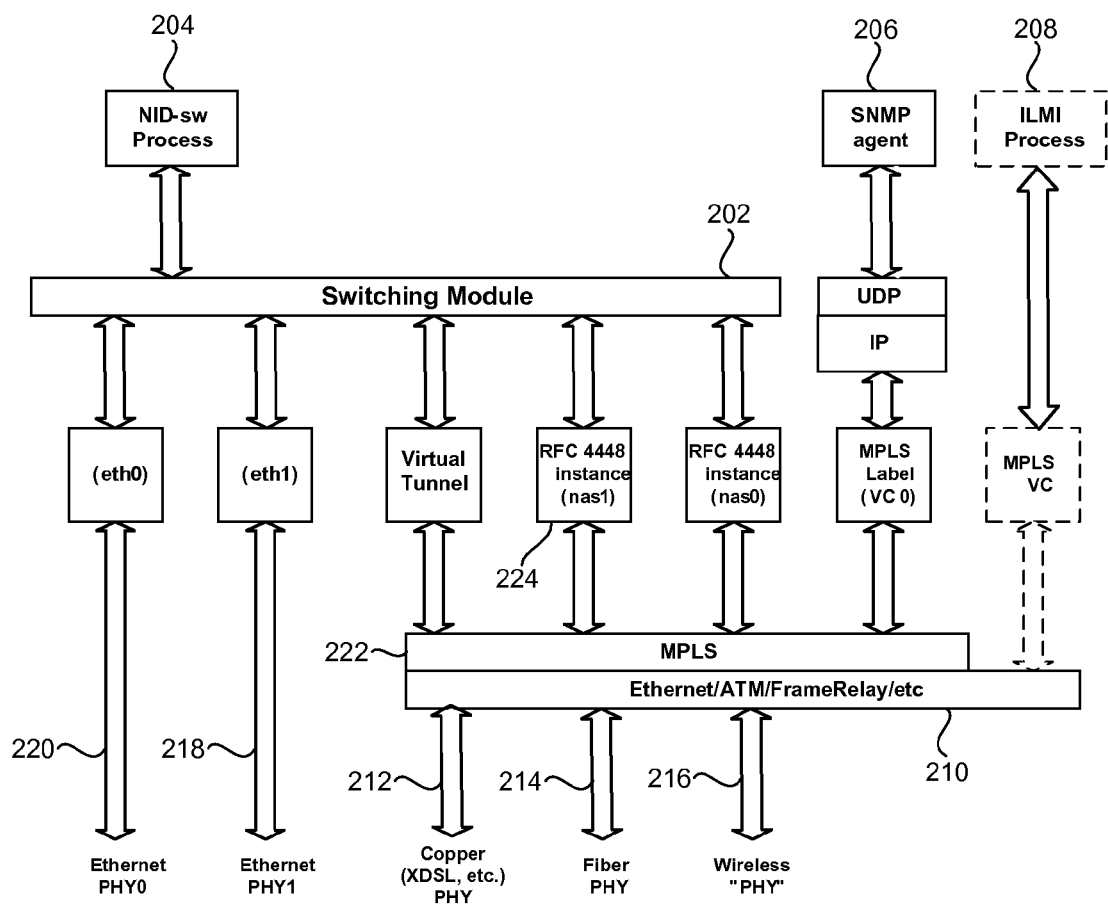
FIG. 2 illustrates an embodiment of a network interface device to provide multiple private networks in terms of the device's internal layers.

FIG. 2 illustrates an implementation of the private networks system or NID embodiment herein in terms of the device's internal layers. The device may be remotely managed by the carrier and can be configured to provide SLA grade service at a single point. The device provides access from the carrier's infrastructure to the user premises for all types of services including voice, data and video.

The NID is designed to be transparent to network traffic carried through the NID. The NID also provides provisioning tools to the carrier. The NID device can internally forward packets between MPLS VCs provisioned for specific QoS to Ethernet LAN ports at the customer premises. The NID is designed to be physically located at the customer premises and provides a single point of interface to the carrier's network.

FIG. 2 illustrates a more detailed layered view of the networking device architecture. Each of the operating system network interfaces is shown at Packet Data Unit (PDU) level. Some of these interfaces are WAN interfaces and are layered over the MPLS stack. Other network interfaces are LAN interfaces or "pseudo" or virtual interfaces.

The networking device includes a switching module 202 and an application process 204 (or NID-sw process) to control the switching module. The networking device also provides both a SNMP agent 206 for control of the device hardware and a web interface 208 for web based remote management of the MPLS system Interim Local Management Interface (ILMI) process.

The networking device forwards incoming packets from a VC channel in the MPLS protocol 222 from the WAN to one of several mapped local Ethernet LAN interfaces 218, 220, etc. The NID can receive information from the WAN over a number of physical interfaces. For example, the physical interfaces can be xDSL 212, an optical fiber network 214, a wireless interface 216, or other physical channels that can transport MPLS.

The NID forwards outgoing packets from each LAN's one or more Ethernet interfaces 218, 220 to their respectively mapped VC channel(s) in the WAN interface. The NID switching system consists of a user space process controller and a packet switcher implemented as the switching module 202. The packet switcher can register an address family or socket type for the Ethernet port. The packet switcher communicates with the user space process controller through this socket.

Referring again to FIG. 2, the switching process 202 can switch packets between any interface using an Ethernet like Media Access Control (MAC) layer and any VCs in the MPLS layer. In one embodiment, the NID can operate in RFC4448 bridged mode 224. This is also known as EoMPLS. In bridged mode, many types of Ethernet packet types can be transmitted including ARP, DHCP, Internet Protocol version 4 (IPv4), Internet Protocol version 6 (IPv6), 802.1 and other common types.

Figure 3:
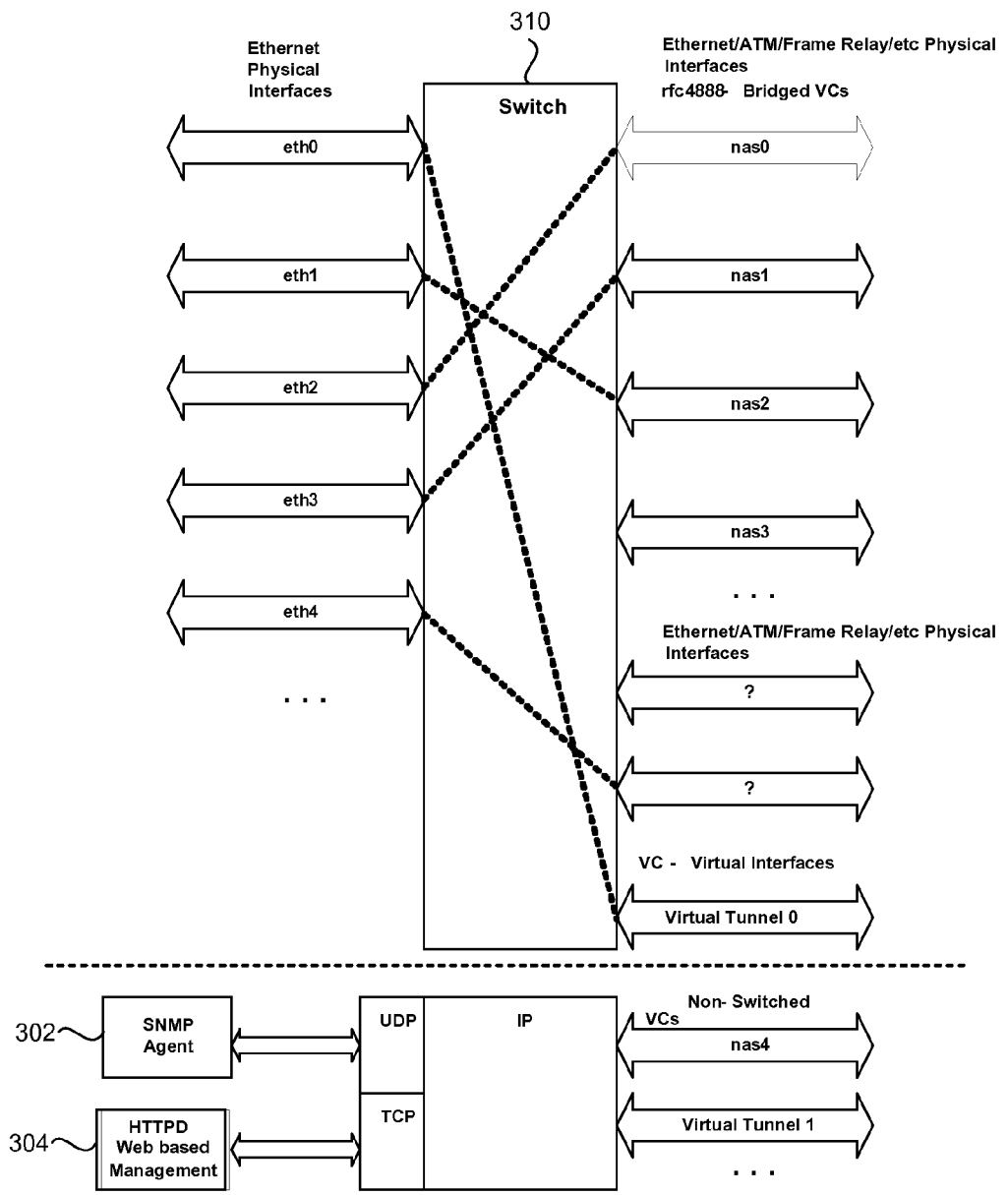
FIG. 3 is a block diagram illustrating switching between bridged Virtual Circuit (VC) interfaces and physical Ethernet interfaces in an embodiment of the invention.

FIG. 3 illustrates an embodiment of the system where the mapping between Ethernet interfaces and VC channels is a one-to-one mapping. However, the mapping may be one VC to two or more Ethernet interfaces or vice-versa. In addition, the switching kernel module is a kernel module that can perform the frame forwarding at layer 2. The "nas" designation in FIG. 3 represents a binding interface that is being created in the NID.

The bottom part of FIG. 3 illustrates that some VC data streams are not switched but can be used to access the user interfaces for the device. The VC data streams can connect through an IP layer and then a User Datagram Protocol (UDP) layer to communicate with the SNMP agent 302. In a similar manner, a VC data stream can pass through a TCP/IP stack to control a Hyper Text Transfer Protocol (HTTP) web based management interface 304 for the networking device.

The NID switch module 310 supports any Ethernet-like or any type of Wide Area Network (WAN) VC interface. The NID may contain two or more types of network interfaces. One type of interface is called controlled interfaces or bridged interfaces. A second type of interface is uncontrolled. These interfaces allow IP traffic to proceed to layer 3 and are primarily for management traffic.

The NID switch module 310 or switch process is a program that can execute in user space. It receives requests from the SNMP agent and the web configuration process for provisioning VCs and retrieving statistics. The switching module may be a NID switch process in one embodiment that contains the main control functions for the NID. The switching kernel module can control one or more switch or bridge interfaces, and provide a mechanism where bridges can be setup.

The present system and method provides LAN Separation. Specifically, the NID can provide virtual separation between separate LANs even though the LANs are all multiplexed across a single WAN physical interface. Users on one network cannot access other networks because the traffic streams are being sent in separate VCs. Virtual Local Area Network (VLAN) tags will be passed transparently to the customer equipment. QinQ will also be passed transparently to the customer equipment.

Protection is also provided against duplicate MAC addresses. While manufacturers of computer hardware generally try to generate unique MAC addresses, the uniqueness of MAC addresses is not guaranteed. When duplicate MAC addresses are visible on networks this can cause severe errors. Ethernet by itself does not have any check for duplicate addresses. Sometimes these errors may even occur between separate networks that are joined by a bridge or Virtual Local Area Network (VLAN) networking protocols.

This effective separation is achieved by separately switching packets between pairs of interfaces at layer 2 of the networking model based on ingress and egress logical interfaces. The NID can maintain many simultaneous logical bridges where each bridge is a member of a logical LAN. Ethernet MAC level duplications or MAC conflicts between LANs do not affect the traffic in another LAN.

The processes described as part of this system and method can execute on any type of operating system. However, in one embodiment, Linux can be used to provide the desired environment for the present system and method. More recent versions of the Linux kernel distribution include an MPLS stack which is quite stable and widely used. The MPLS stack supports layering of EoMPLS 222 (FIG. 2) over the generic Ethernet, ATM, or Frame Relay layer 210 which in turn can be layered over the physical device drivers as in blocks 212, 214 and 216. The NID may use the Linux kernel MPLS stack for establishing MPLS VCs at a specified QoS.

FIG. 2 illustrates that the RFC 4448 module 224 may be provided as part of the Linux MPLS stack. This module creates the RFC 4448 interfaces that allow an MPLS VC to emulate an Ethernet interface. This module is desirable because the NID switch module is configured to switch traffic between real Ethernet interfaces and interfaces which emulate Ethernet MACs.

Many types of wireless interfaces may be supported by the present system and method because wireless connections can emulate Ethernet MACs. There are some complexities with the 802.11 wireless interface types, but generally the specific configuration parameters can be provided to enable the appropriate communications.

The NID can be remotely managed, as discussed previously. At least three mechanisms can be provided for configuration and management. These access mechanisms can include secure shell access (SSH), SNMP, and web based management. Generally, the NID will be configured via SNMP or the Web interface. Most configuration options may be automatic. An administrator may perform functions such as checking on the status of all currently configured bridges by accessing the management interface.

The NID switch may receive power from the Telecommunication Company (Telco) or network service provider. This provides line power over the copper twisted pair from the Telco at the end user's location and avoids the need for batteries or local transformers. This means that copper will continue to exist for the last mile. If fiber is used to the customer's premises, then the connection from the remote terminal may include a hybrid cable, fiber and copper. The fiber may be used for the communications and the copper for the power.

Figure 4:
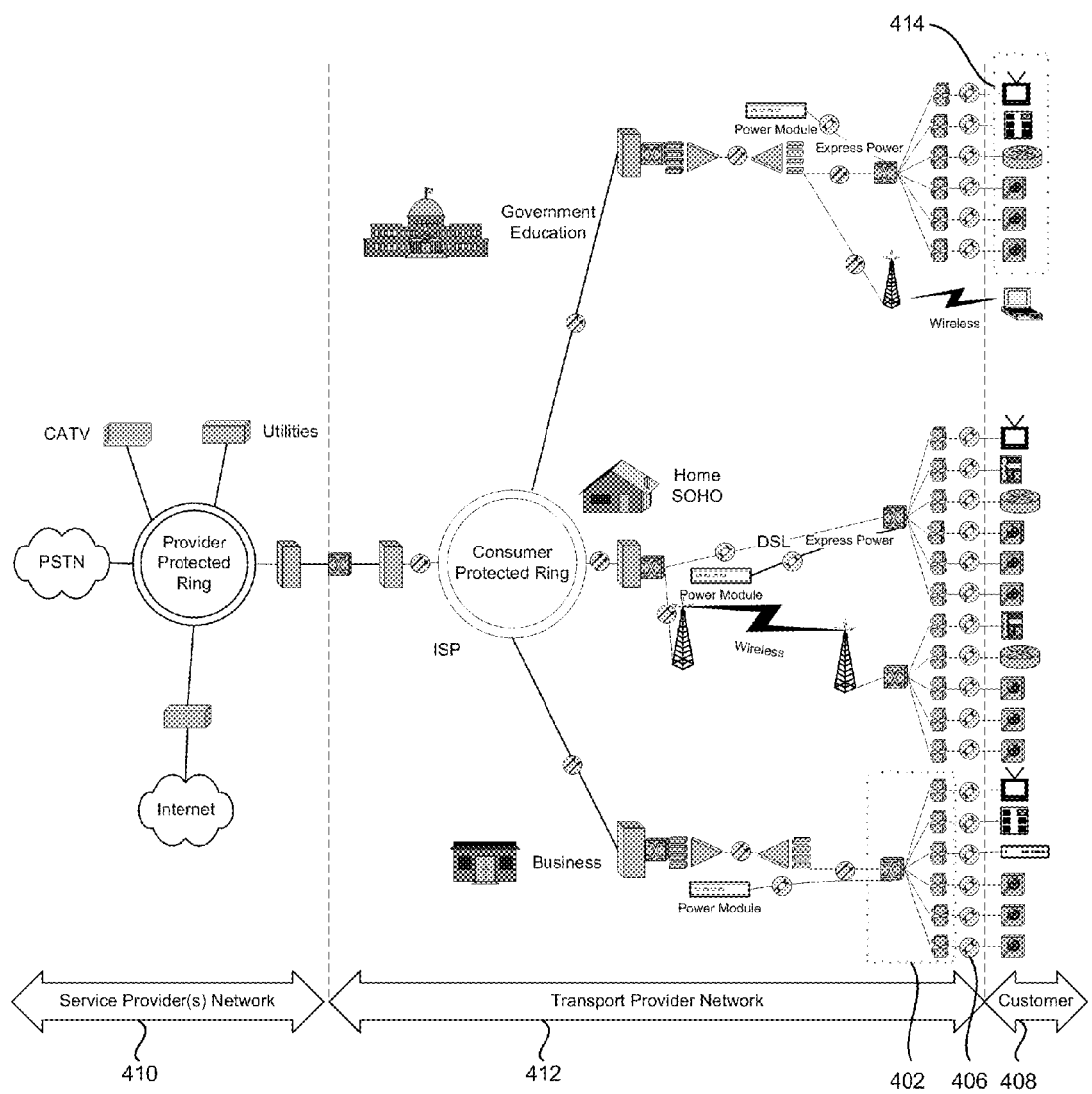
FIG. 4 is a block diagram illustrating a high level view of a logical organization for a broadband network in an embodiment of the invention.

FIG. 4 is a block diagram illustrating a high level view of a logical organization for a broadband network using an embodiment of the NID. In particular, the NID 402 of the present system and method is displayed as the interface between the transport provider's network 412 and the customer premises 408. The connection between the NID and the networks or devices at the customer premises can be a fiber pair 406.

The types of devices that may be on separate networks includes networked devices 414 such as cable TV, a VoIP line, a LAN, Utility Management Devices (e.g., water, gas, electric), a Private Branch eXchange (PBX), or other networked devices. This configuration allows the connected LANs and their end devices to communicate with entities or networks that are accessed through a service provider's network 410. For example, the connected LANs may communication with TV providers, utility providers, Internet Service Providers (ISP), voice networks, video networks or other service provider networks.

The configuration described allows service providers to create a separate network for each type of device or class of devices. For example, utilities can monitor the appropriate usage devices without requiring that a service person visit the usage meter. IPTV, voice services, video services, and Internet services can each have a separate protected network. Because each service is on its own network, each service is protected from processes and individuals who are accessing other networks. This division provides an increased level of security without dramatically increasing the amount of hardware that is needed at the customer premises. FIG. 4A is a legend for the devices illustrated in FIG. 4.

Figure 5:
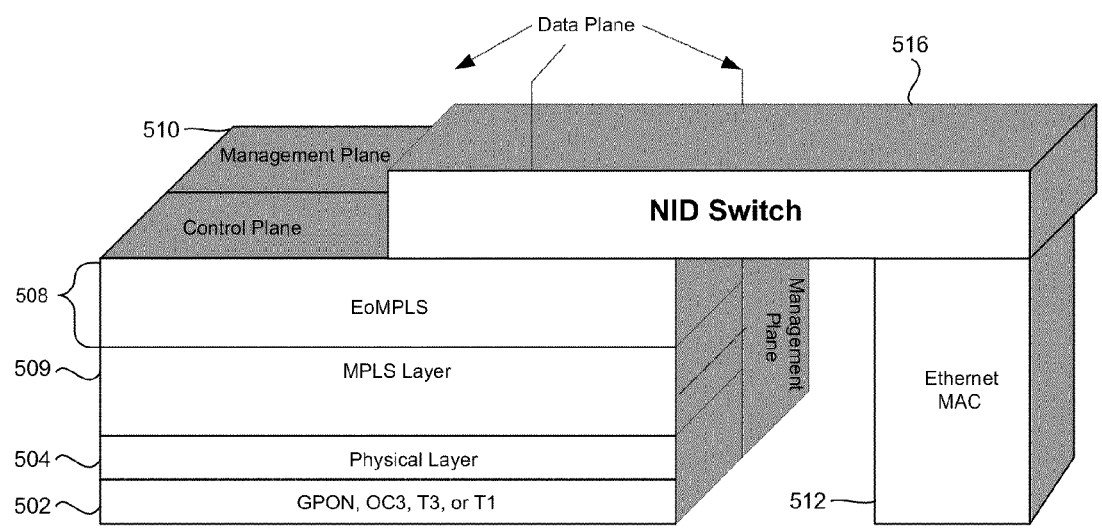
FIG. 5 is a perspective drawing of the layering in the network interface device and MPLS layer; and 7

FIG. 5 is a perspective drawing of an embodiment of the network layering in the NID using the MPLS protocol. In particular, a number of layers are shown for the switching and translation that takes place. The physical medium layer 502 is shown as a telecommunications connection that may be a high speed data connection. For example, the high-speed connection may be a T1, T3, OC3, or another higher speed connection such as GPON in one embodiment. A physical connection layer 504 can be used to network the physical media connections.

An MPLS layer 509 is provided with VCs over which the packet switched packets can be transported. The NID switch 516 receives the VCs through the described layers and then maps separate VCs to individual Ethernet ports 512. A management data layer or plane 510 is also provided for managing the NID switch.

Figure 6:
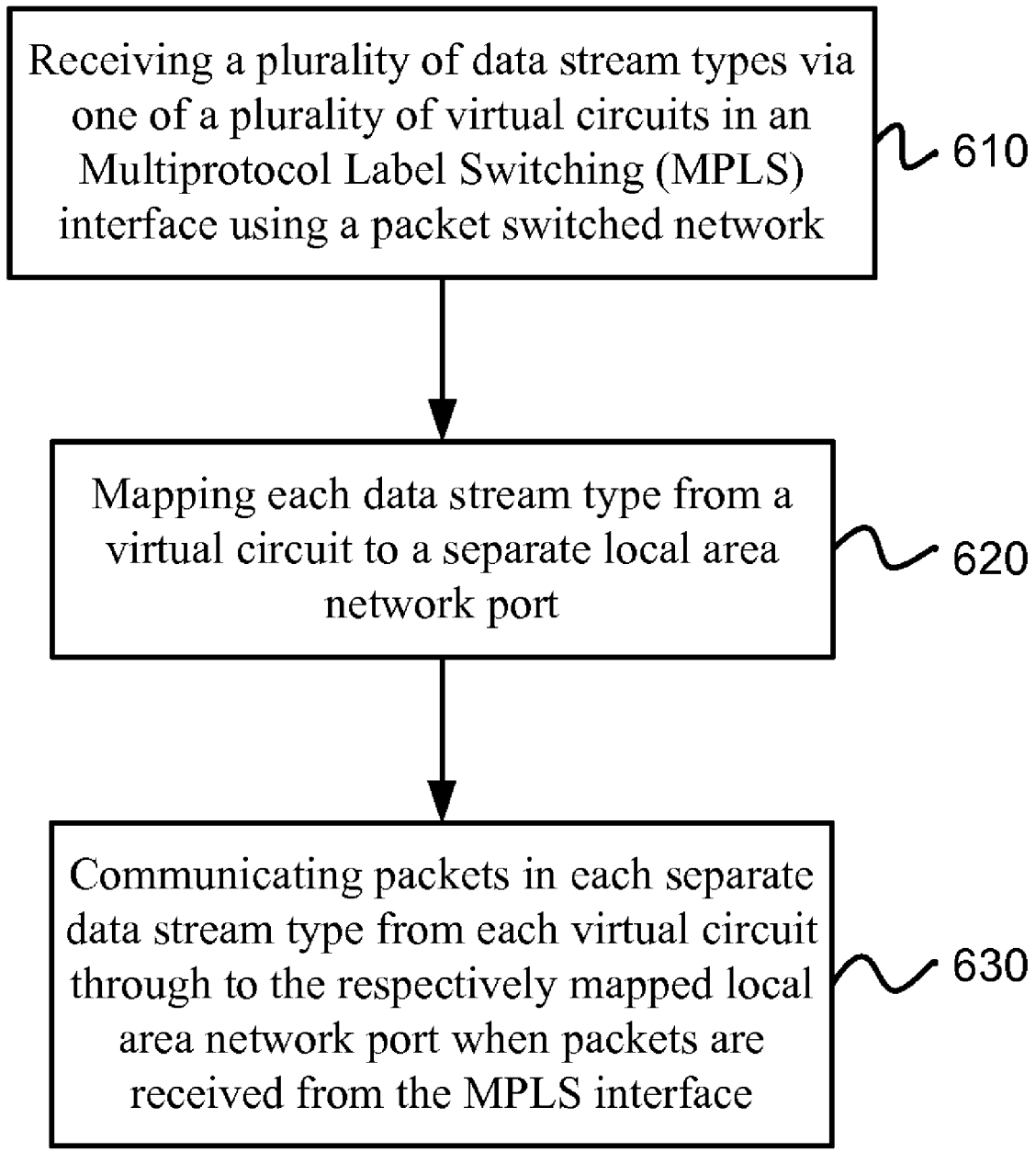
FIG. 6 is a flow chart illustrating a method to provide multiple private networks in accordance with an embodiment of the present invention

FIG. 6 illustrates a method for interfacing with a network. A first operation is receiving a plurality of data stream types via one of a plurality of virtual circuits in an MPLS interface using a packet switched network, as in block 610.

Each data stream type can be mapped from a virtual circuit to a separate LAN port, as in block 620. Each data stream type can be mapped to a physical Ethernet Port using RFC 4448 Encapsulation Methods for Transport of Ethernet over MPLS.

The packets in each separate data stream type can be communicated from each virtual circuit through to the respectively mapped LAN port when packets are received from the MPLS interface, as in block 630. Each data stream type can be transmitted through a respectively mapped Ethernet port. The transmitting of the packets in each data stream type can be done by switching packets from the MPLS interface to separately mapped Ethernet ports using a switching process.

The switching process can also have user interface controls. The operation of controlling the switching process can be performed via a user space control process configured to control switching process settings. The user input for the control process can be received via a remote management interface in communication with the user space control process.

The present system and method provides a new breed of intelligent NIDs to establish improved management and engineering concepts and to enable transport carriers to deliver traditional, as well as packet-based, voice and tiered-data services from multiple service providers, over a single access network profitably. Using standards-based technology, these NIDs can create new revenue opportunities and reduce operational costs.

Specifically, the present NIDs can be designed to ensure that QoS objectives are satisfied for new and existing traffic flows and protect against congestion and degradation of network performance. The NIDs can monitor and control the latency, jitter, average and peak rate, and loss ratios to ensure that availability and performance is within acceptable or contracted service bounds, and that premium or priority services are given preferential treatment. To achieve this, the NID provides facilities for traffic classification, admission control, traffic shaping and rate control. Classifiers within the NID can map network traffic requiring the same or similar QoS treatment to specific outbound queues.

Admission control services within the NID can ensure that the requested traffic profile and QoS levels be met concerning current network state, resource availability or other policy-based considerations prior to admitting the traffic flow. In addition, a variety of traffic-shaping and conditioning mechanisms can be employed to monitor and maintain compliance with traffic profiles or contracts. Finally, metering services may monitor and measure traffic against its profile and pass network traffic along to the appropriate policing mechanisms (e.g., the queuing and dropping services).

Once the NID has classified and groomed the service flows appropriately, traffic engineering services must be applied to aggregate and map them efficiently onto the existing network topology to control network behavior, optimize network resources and maximize traffic delivery performance.

In heterogeneous public networks, a switching protocol that is independent of the service providers represents the best alternative for enabling NIDs to perform traffic engineering and manage QoS. Since this switching protocol operates independent of Internet protocols, it becomes protocol-agnostic, and separates forwarding and control functions cleanly from service functions. The protocol supplies the intelligence required to associate a traffic stream with its type of service and processes the traffic stream according to the specified traffic contract or SLA.

This switching protocol gives NIDs the ability to associate and allocate any type of traffic with a particular service class. Each service class represents an aggregation of traffic that will be treated in the same manner as it traverses the network. These service classes are mapped to service policies that have been engineered to support specific SLAs (e.g., guaranteed bandwidth, low latency).

NIDs in the present system and method can create access networks that are feature-location agnostic by supporting both a physical and logical distribution of network intelligence. This virtualization of the access network enables carriers to deliver extremely scalable, efficient and secure private voice and data networks and transparently drive voice and unified communication features directly to the customer's doorstep. Intelligent NIDs reduce the complexity and operational costs associated with operating multiple networks for each service and provide a single network infrastructure that creates opportunities for bundling products, single billing, and developing new services that leverage voice, video and data services.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A system to provide multiple private networks, comprising:
    a Multi-Protocol Label Switching (MPLS) interface configured to receive a plurality of Virtual Circuit (VC) data streams from a packet switched network;
    a plurality of physically separate local area network (LAN) ports configured to communicate data to LAN ports; and
    a switching process between the MPLS interface and the LAN ports, the switching process being configured to create bindings, wherein each binding binds an individual VC data stream from the MPLS interface to each of the respective LAN ports so as to communicate data packets between the MPLS interface and the bound LAN ports, the data packets being assigned to an individual LAN port based on the VC data stream binding, wherein an Ethernet frame format of each data packet includes an Ethernet Media Access Control (MAC) address, wherein the bindings are created independent of the Ethernet frame format MAC address and leave the Ethernet frame format unaltered, such that prior to encapsulation at the MPLS interface of a data packet being transmitted from a specific LAN port to the packet switched network via a specific binding and after de-encapsulation at the MPLS interface of a data packet being transmitted from the packet switched network to the specific LAN port via the specific binding, the specific binding hides the MAC address of the Ethernet frame format of the data packet through that binding from other LAN ports;
    wherein the bindings between the MPLS interface and the LAN ports provide network security by hiding the MAC addresses such that a security breach using a duplicate MAC address on a LAN port does not affect operation of other LAN ports.

2. A system as in claim 1, wherein each LAN port is a physically separate Ethernet port.

3. A system as in claim 1, wherein the individual data stream that is bound to a single physically separate LAN port is a using a VC label.

4. A system as in claim 1, wherein the individual data stream is bound to a physically separate LAN port by desired Quality of Service (QoS) and each LAN port is physically separate from and disconnected from all other LAN ports.

5. A system as in claim 1, further comprising a user space control process configured to control settings for bound LAN ports and switching paths used by the bound LAN ports.

6. A system as in claim 5, further comprising a remote management interface in communication with the user space control process.

7. A system as in claim 6, wherein the remote management interface includes a Simple Network Management Protocol (SNMP) interface and a web interface.

8. A system as in claim 1, wherein the MPLS interface further comprises a plurality of VCs through which packets are received from a Wide Area Network (WAN) network.

9. A system as in claim 1, wherein the switching process registers each LAN by port number and communicates through an operating system to each LAN.

10. A system as in claim 1, wherein the LANs are Ethernet networks having no tags, headers, layers, or fields between an Ethernet header and an IP header.

11. A system as in claim 1, wherein the packet switched network is MPLS.

12. A system as in claim 1, wherein the switching process maps individual VC's to separate physical LAN ports using Encapsulation Methods for Transport of Ethernet over MPLS (EoMPLS).

13. A system as in claim 1, wherein the LAN ports are virtual network interface devices.

14. A system as in claim 13, wherein the virtual network interfaces devices are wireless LAN ports.

15. A method for interfacing with a network, comprising:
receiving a plurality of data streams via one of a plurality of Virtual Circuit (VCs) in an MPLS interface using a packet switched network;
binding each data stream from a VC to a physically separate LAN port;
communicating data packets in each separate data stream from each VC through to the respectively bound LAN port when data packets are received from the MPLS interface, wherein an Ethernet frame format of each data packet includes an Ethernet Media Access Control (MAC) address, wherein the bindings are created independent of the Ethernet frame format MAC address and leave the Ethernet frame format unaltered, such that prior to encapsulation at the MPLS interface of a data packet being transmitted from a specific LAN port to the packet switched network via a specific binding and after de-encapsulation at the MPLS interface of a data packet being transmitted from the packet switched network to the specific LAN port via the specific binding, the specific binding hides the MAC address of the Ethernet frame format of the data packet through that binding from other LAN ports; and
wherein the bindings between the MPLS interface and the physically separate LAN ports provide network security by hiding the MAC addresses such that a security breach using a duplicate MAC address on a LAN port cannot affect operation of other LAN ports.

16. A method as in claim 15, wherein the step of communicating data packets further comprises a step of transmitting each data stream through bound Ethernet ports.

17. A method as in claim 15, wherein mapping binding each data stream to a physically separate LAN further comprises a step of binding each VC data stream to a physical Ethernet Port using EoMPLS.

18. A method as in claim 15, further comprising a step of switching data packets from the MPLS interface to separately mapped Ethernet ports using a switching process.

19. A method as in claim 18, further comprising a step of controlling the switching process via a user space control process configured to control switching process settings.

20. A system as in claim 19, further comprising a step of receiving user input via a remote management interface in communication with the user space control process.

21. A system for interfacing between networks, comprising:
an MPLS interface configured to receive a plurality of data streams via one of a plurality of Virtual Circuit (VCs) over a packet switched network;
a plurality of physically separate Ethernet ports configured to communicate data to a LAN, wherein each LAN is differentiated by the physical LAN port; a switching process in communication with the MPLS interface and the Ethernet ports, the switching process being configured to bind each of the VCs to each of the separate Ethernet ports and to forward data packets between the MPLS interface and bound Ethernet ports, wherein an Ethernet frame format of each data packet includes an Ethernet Media Access Control (MAC) address, wherein the bindings are created independent of the Ethernet frame format MAC address and leave the Ethernet frame format unaltered, such that prior to encapsulation at the MPLS interface of a data packet being transmitted from a specific LAN port to the packet switched network via a specific binding and after de-encapsulation at the MPLS interface of a data packet being transmitted from the packet switched network to the specific LAN port via the specific binding, the specific binding hides the MAC address of the Ethernet frame format of the data packet through that binding from other LAN ports; and
wherein the bindings between the VCs and the Ethernet ports provide network security by hiding the MAC addresses such that a security breach using a duplicate MAC address on an Ethernet port cannot affect operation of other Ethernet ports.

22. A system as in claim 21, wherein the switching process binds individual VCs to individual Ethernet ports using only EoMPLS.

23. A system as in claim 21, further comprising a user space control process configured to control settings and input for the switching process.

24. A system as in claim 23, further comprising a remote management interface in communication with the user space control process.

* * * * *